US010878297B2

(12) United States Patent
Dubovsky et al.

(10) Patent No.: US 10,878,297 B2
(45) Date of Patent: Dec. 29, 2020

(54) SYSTEM AND METHOD FOR A VISUAL RECOGNITION AND/OR DETECTION OF A POTENTIALLY UNBOUNDED SET OF CATEGORIES WITH LIMITED EXAMPLES PER CATEGORY AND RESTRICTED QUERY SCOPE

(71) Applicant: International Business Machines Corporation, Armonk, NY (US)

(72) Inventors: Oded Dubovsky, Haifa (IL); Leonid Karlinsky, Mazkeret Batya (IL); Joseph Shtok, Binyamina (IL)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 16/115,572

(22) Filed: Aug. 29, 2018

(65) Prior Publication Data
US 2020/0074247 A1 Mar. 5, 2020

(51) Int. Cl.
*G06N 3/02* (2006.01)
*G06N 20/00* (2019.01)
(Continued)

(52) U.S. Cl.
CPC ........... *G06K 9/66* (2013.01); *G06F 16/5838* (2019.01); *G06K 9/627* (2013.01); *G06K 9/628* (2013.01); *G06K 9/6256* (2013.01); *G06N 3/08* (2013.01)

(58) Field of Classification Search
USPC ........ 382/116–118, 151–160, 170, 181–228, 382/312; 706/6–23, 25–62
See application file for complete search history.

(56) References Cited

U.S. PATENT DOCUMENTS

2017/0286809 A1 10/2017 Pankanti et al.
2019/0065899 A1* 2/2019 Movshovitz-Attias ...................... G06K 9/6256

(Continued)

FOREIGN PATENT DOCUMENTS

| CN | 104866810 | 8/2015 |
| CN | 106897746 | 6/2017 |
| WO | 2014205231 | 12/2014 |
| WO | 2017160688 | 9/2017 |

OTHER PUBLICATIONS

Lawrence et al., "Face recognition: a convolutional neural-network approach", IEEE Transactions on Neural Networks, Jan. 1997, pp. 98-113, vol. 8, Issue 1.

(Continued)

*Primary Examiner* — Marcellus J Augustin
(74) *Attorney, Agent, or Firm* — Gregory J Kirsch

(57) ABSTRACT

Embodiments may provide visual recognition techniques that provide improved recognition accuracy and reduced use of computing resources in cases where only a small set of examples is used to train an unlimited number of recognized categories. For example, in an embodiment, a computer-implemented method of visual recognition may comprise generating a plurality of personal embedding models, each personal embedding model including categories relating to a person, and object, or a subject, wherein at least some of the personal embedding models include at least some different categories, training the plurality of personal embedding models using image training data having a limited number of examples of each category, wherein the examples of each category are used to train more than one category in more than one of the personal embedding models, recognizing images from image data using the plurality of personal embedding models, and outputting information relating to the recognized images.

14 Claims, 5 Drawing Sheets

(51) Int. Cl.
*G06K 9/62* (2006.01)
*G06F 16/583* (2019.01)
*G06K 9/66* (2006.01)
*G06N 3/08* (2006.01)

(56) References Cited

U.S. PATENT DOCUMENTS

| | | | | |
|---|---|---|---|---|
| 2019/0065957 | A1* | 2/2019 | Movshovitz-Attias | ................... G06N 3/084 |
| 2019/0130231 | A1* | 5/2019 | Liu | ................ G06K 9/4628 |
| 2019/0172224 | A1* | 6/2019 | Vajda | ................. G06T 7/77 |
| 2019/0251445 | A1* | 8/2019 | Movshovitz-Attias | ................... G06N 3/08 |
| 2019/0258925 | A1* | 8/2019 | Li | ................ G06F 16/583 |
| 2019/0384304 | A1* | 12/2019 | Towal | ................. G06N 3/04 |

OTHER PUBLICATIONS

Carthy, "Face.com Brings Facial Recognition to Facebook Photos (We Have Invites)", TechCrunch.com, Mar. 24, 2009 (retrieved Jul. 29, 2018). Available at: https://techcrunch.com/2009/03/24/facecom-brings-facial-recognition-to-facebook-photos-we-have-invites/.

Song et al., "Deep Metric Learning via Lifted Structured Feature Embedding", IEEE Conference on Computer Vision and Pattern Recognition (CVPR), Jun. 2016, pp. 4004-2012.

Schroff et al., "FaceNet: A unified embedding for face recognition and clustering", IEEE Conference on Computer Vision and Pattern Recognition (CVPR), 2015, pp. 815-823.

Sohn, "Improved Deep Metric Learning with Multi-class N-pair Loss Objective", 30th Conference on Neural Information Processing Systems (NIPS), 2016, Barcelona, Spain.

* cited by examiner

SYSTEM AND METHOD FOR A VISUAL RECOGNITION AND/OR DETECTION OF A POTENTIALLY UNBOUNDED SET OF CATEGORIES WITH LIMITED EXAMPLES PER CATEGORY AND RESTRICTED QUERY SCOPE

BACKGROUND

The present invention relates to techniques for visual recognition and/or detection of a potentially unbounded set of categories with limited examples per category and restricted query scope.

Visual recognition is a function of computer vision in which computers may recognize or identify features or structures in digital images or videos. Conventional visual recognition techniques may have difficulty in operating properly in a number of types of conditions. For example, an unbounded visual recognition and/or detection problem may be difficult for conventional visual recognition techniques. Unbounded visual recognition may arise where the visual recognition target is unknown in advance, where the target is known, but not used, or where the number of targets is unlimited. Conventional visual recognition techniques may have particular difficulty when only a small set of examples is used to train an unlimited number of recognized categories. An unbounded Visual Recognition (VR)/detection problem contains many challenges: as the number of categories grow, the recognition rates (hits) may be reduced due to the similarity that naturally takes place between classes over time, the runtime for search and comparison against the matching class may increase, and large training data sets for deep learning/machine learning may be required.

Recognizing the structure of the global domain of categories as composed of personal subdomains, conventional visual recognition techniques may restrict the search to the relevant subdomain. For example, one instance of the stated general problem is the face recognition problem, where the number of categories (faces) is not bounded. For example, existing face recognition techniques used for tagging a person in online photos may restrict the search to the photo collections of friends of the person. Such conventional techniques may employ a single classifier or embedding to address the task.

Accordingly, a need arises for visual recognition techniques that provide improved performance, in terms of recognition accuracy and computing resources, than conventional techniques in cases where only a small set of examples is used to train an unlimited number of recognized categories.

SUMMARY

Embodiments of the present systems and methods may provide visual recognition techniques that provide improved performance, in terms of recognition accuracy and computing resources, than conventional techniques in cases where only a small set of examples is used to train an unlimited number of recognized categories. For example, embodiments, may provide recognition of a set of visual categories in still images produced by a set of image sources (users). In the training stage, for example, the system may be provided with a dataset of visual examples, each example labeled with a visual category it belongs to and with identification of a user the image came from. In the evaluation stage, the system may receive a new image, along with its source (user) ID, and may, for example, produce a list of possible categories the object in the image belongs to, along with corresponding confidence scores.

For example, in an embodiment, a computer-implemented method of visual recognition may comprise training a deep convolutional neural network including a common backbone network, a plurality of embedding subnetworks, and a classification model on a training dataset comprising a plurality of visual categories, wherein the plurality of embedding subnetworks are trained jointly using a single loss function, recognizing images from image data received from image sources using the trained deep convolutional neural network, and outputting information relating to the recognized images.

In embodiments, embedding subnetwork may correspond to at least one visual category. The training dataset may comprise a plurality of multi-plets, each multi-plet corresponding to a visual category and comprising an anchor data point from the visual category and a data point pair for each of the plurality of embedding subnetworks being trained, wherein each data point pair comprises a positive data point from the visual category and a negative data point from another visual category. The negative data point may comprise a data point from the another category that is closest to the anchor data point and the positive data point is selected from one of: a data point selected randomly from the category, a data point selected from a few data points from the category that are closest to the anchor data point, and a data point from the category that is the closest to the anchor data point in the embedding subnetwork of the data point pair. The loss function may comprise when a minimum distance between the anchor data point and each positive data point in each corresponding embedding plus a predetermined constant margin is smaller than a minimum distance between the anchor data point and each negative data point in each corresponding embedding, making no adjustment to parameters of the deep convolutional neural network and otherwise, adjusting parameters of the deep convolutional neural network so that the anchor data point is closer to a positive data point than to a negative data point in at least one embedding subnetwork. This may be achieved by reducing the minimum distance between the anchor data point and each positive data point (in each corresponding embedding) below the corresponding minimum over the distances between the anchor and the negative data points. Recognizing the images may comprises computing a confidence score for each image indicating similarity of each image with data points in each visual category, weighting the confidence scores by a per-class posterior distribution including a weight distribution on the embedding subnetworks given the categories and computed on training data, and weighting the confidence scores by a per-user posterior distribution including a weight distribution on the embedding subnetworks given an identification of a user. Weighting the confidence scores by a per-user posterior distribution may provide personalization of results based on features that are important to the user.

In an embodiment, a system for visual recognition may comprise a processor, memory accessible by the processor, and computer program instructions stored in the memory and executable by the processor to perform: training a deep convolutional neural network including a common backbone network, a plurality of embedding subnetworks, and a classification model on a training dataset comprising a plurality of visual categories, wherein the plurality of embedding subnetworks are trained jointly using a single loss function, recognizing images from image data received from image sources using the trained deep convolutional neural network, and outputting information relating to the recognized images.

In an embodiment, a computer program product for visual recognition may comprise a non-transitory computer readable storage having program instructions embodied therewith, the program instructions executable by a computer, to cause the computer to perform a method comprising: training a deep convolutional neural network including a common backbone network, a plurality of embedding subnetworks, and a classification model on a training dataset comprising a plurality of visual categories, wherein the plurality of embedding subnetworks are trained jointly using a single loss function, recognizing images from image data received from image sources using the trained deep convolutional neural network, and outputting information relating to the recognized images.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments of the present systems and methods may provide visual recognition techniques that provide improved performance, in terms of recognition accuracy and computing resources, than conventional techniques in cases where only a small set of data points is used to train an unlimited number of recognized categories. For example, embodiments, may provide recognition of a set of visual categories in still images produced by a set of image sources (users). In the training stage, for example, the system may be provided with a dataset of visual data points, each data point labeled with a visual category it belongs to and with identification of a user the image came from. In the evaluation stage, the system may receive a new image, along with its source (user) ID, and may, for example, produce a list of possible categories the object in the image belongs to, along with corresponding confidence scores.

For example, embodiments of the present systems and methods may be applicable to unbounded sets of recognized visual categories, each with only few data points, where multiple users are each interested in a small subset of the categories. Further, the categories may have intrinsic subdivision to sub-categories that are not known a-priori. Such applications may include, for example, personal food recognition, such as different home meals, face recognition, ultimately possibly including all the people on the planet, retail product recognition, such as in a supermarket, etc.

Figure 1:
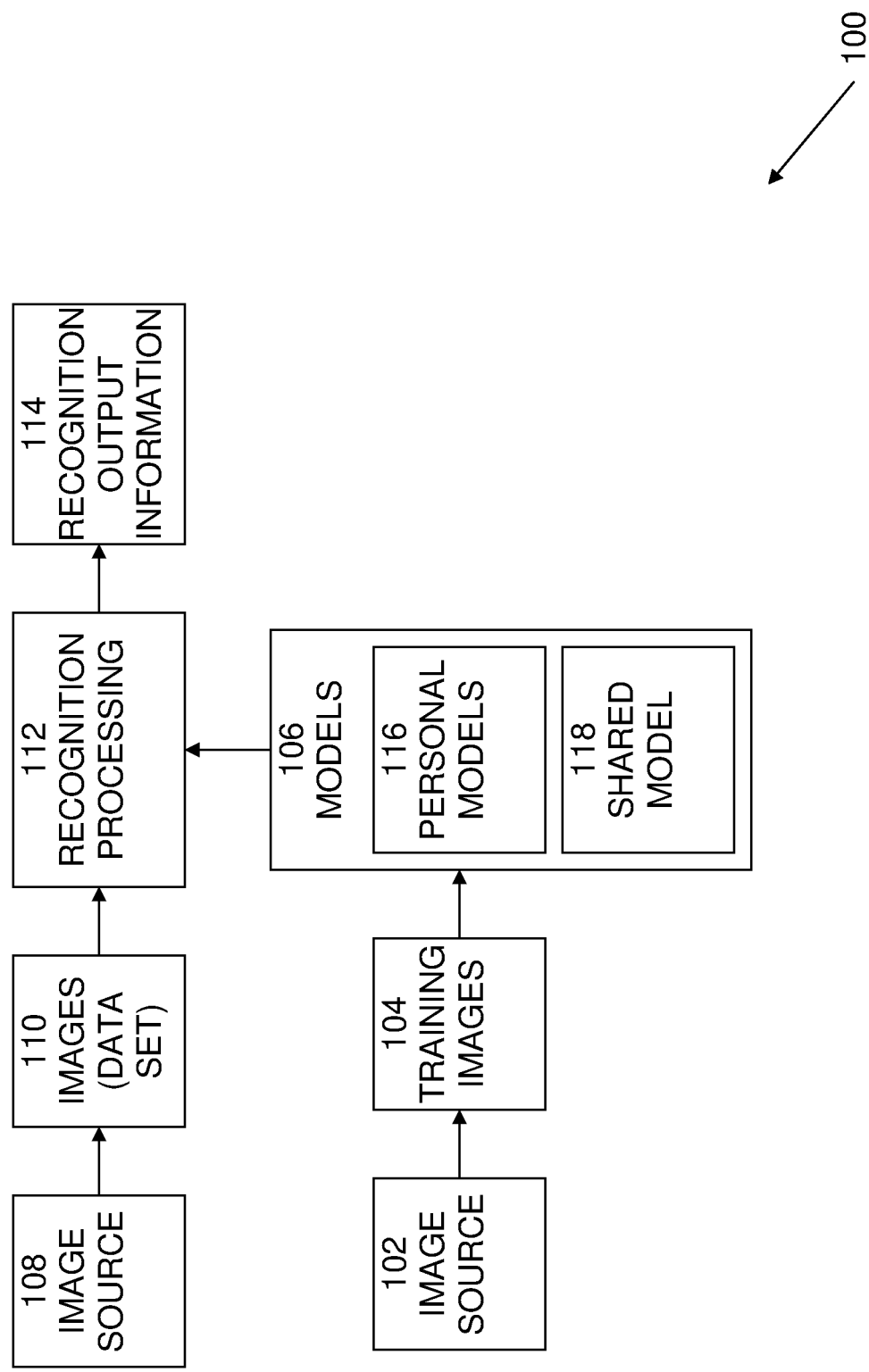
FIG. 1 illustrates an exemplary system in which embodiments of the present systems and methods may be implemented.

An example of a typical visual recognition system 100 is shown in FIG. 1. System 100 may include an image source 102, one or more training images 104, which may form a dataset for visual recognition model training, models 106, recognition processing 108, image source 108, images 110, which may form a dataset for visual recognition processing 112, recognition processing 112, and recognition output information 114. Image sources 102, 108 may be any source of image data, such as social media, cameras, internet sites, etc. Image sources 102, 108 may be separate sources, or they may be the same source or set of sources. Training images 104 and images 110 may include image data obtained from image sources 102, 108, respectively. Training images 104 may be used to train models 106 and may be labeled or annotated, while images 110 may be input to recognition processing 108 for recognition. Models 106 may include at least one personal model 116 and at least one shared model 118. Personal models 116 and shared model 118 may be similar in structure, but typically have been trained using different image data, such as different sets of images. Personal models 116 may be trained using image data associated with particular users, individuals, or subjects. For example, at least one personal model 116 may be trained for each user of system 100. Further, at least one personal model 116 may be trained for each associated individual, or each other individual of interest. Likewise, at least one personal model 116 may be trained for each particular subject of interest. For example, subjects of interest may include different activities occurring in images, different locations in images, different types of structures, vehicles, vessels, etc., and other types of subjects of images. Although this document may refer to personal models for "users", this is merely an example used for clarity. It is to be noted that any type of individual or subject may have one or more personal models.

Models 106 may be used by recognition processing 112 to recognize features, persons, items, subjects, etc. that may be present in images 110. The output 114 from recognition processing 112 may include identifications of such features, persons, items, subjects, etc., as well as likelihoods or confidences in the recognitions.

Figure 2:
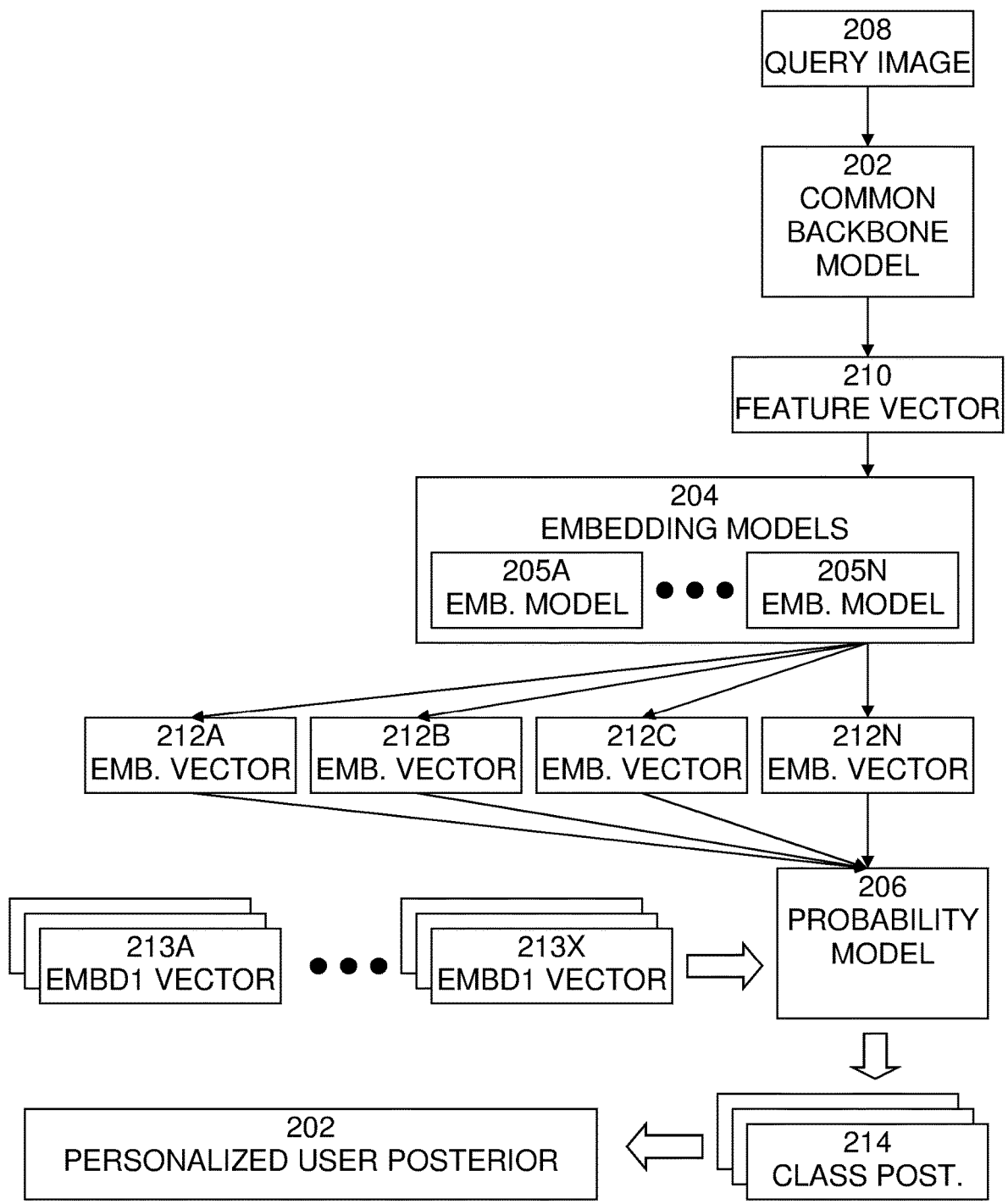
FIG. 2 is an exemplary block diagram of a processing architecture according to embodiments of the present systems and methods.

An example of a processing architecture 200 according to embodiments of the present systems and methods is shown in FIG. 2. Processing architecture 200 may implement a deep convolutional neural network (DNN). In this example, architecture 200 may include a common backbone model 202, an embedding model 204, and a probability model 206. Probability model 206 may include, or may be followed by, a set of embedding subnetworks, connected in parallel to the backbone output. Outputs of all the embedding subnetworks are connected to the classifier head.

Common backbone model 202 may include a neural network that processes the input image, such as query image 208 and produces a feature vector 210 encoding information on the features that are present in query image 208. Embedding model 204 may include a plurality of embedding models or subnetworks 205A-N, each of which produces a different feature vector, referred to as embedding vectors 212A-N. Each embedding vector 212A-N may belong to an embedding space and may include a plurality of values, each value representing a value of a particular feature or dimension. Each embedding vector 212A-N may be configured so as to represent a particular category of the data, such as the same type of food, the same face, the same product, etc. Each embedding space may represent one or more categories, subsets of categories, or portions of categories, which may be predefined, learned, or a combination of both.

During training, the embedding models may be trained in parallel or jointly using a single loss function.

In embodiments, the models may be configured so that each data point is close to its embedding space in at least one category. However, it is not required that each data point is close to its embedding space in all or most categories. Such embodiments may provide advantages, such as the ability to handle many categories and large amounts of data without overloading any particular embedding model. Further, embodiments may be extended by adding embedding models 205 to embedding models 204, which may provide the capability to handle additional categories and data points. The embedding space, as represented by the selection of included features, may be configured so advance the goal of making close data points belong to the same category.

Probability model 206, also known as a classifier head, receives the set of embedding vectors 212A-N and the user ID of query image 208 and produces a set of confidence scores corresponding to a list of categories 214.

Figure 3:
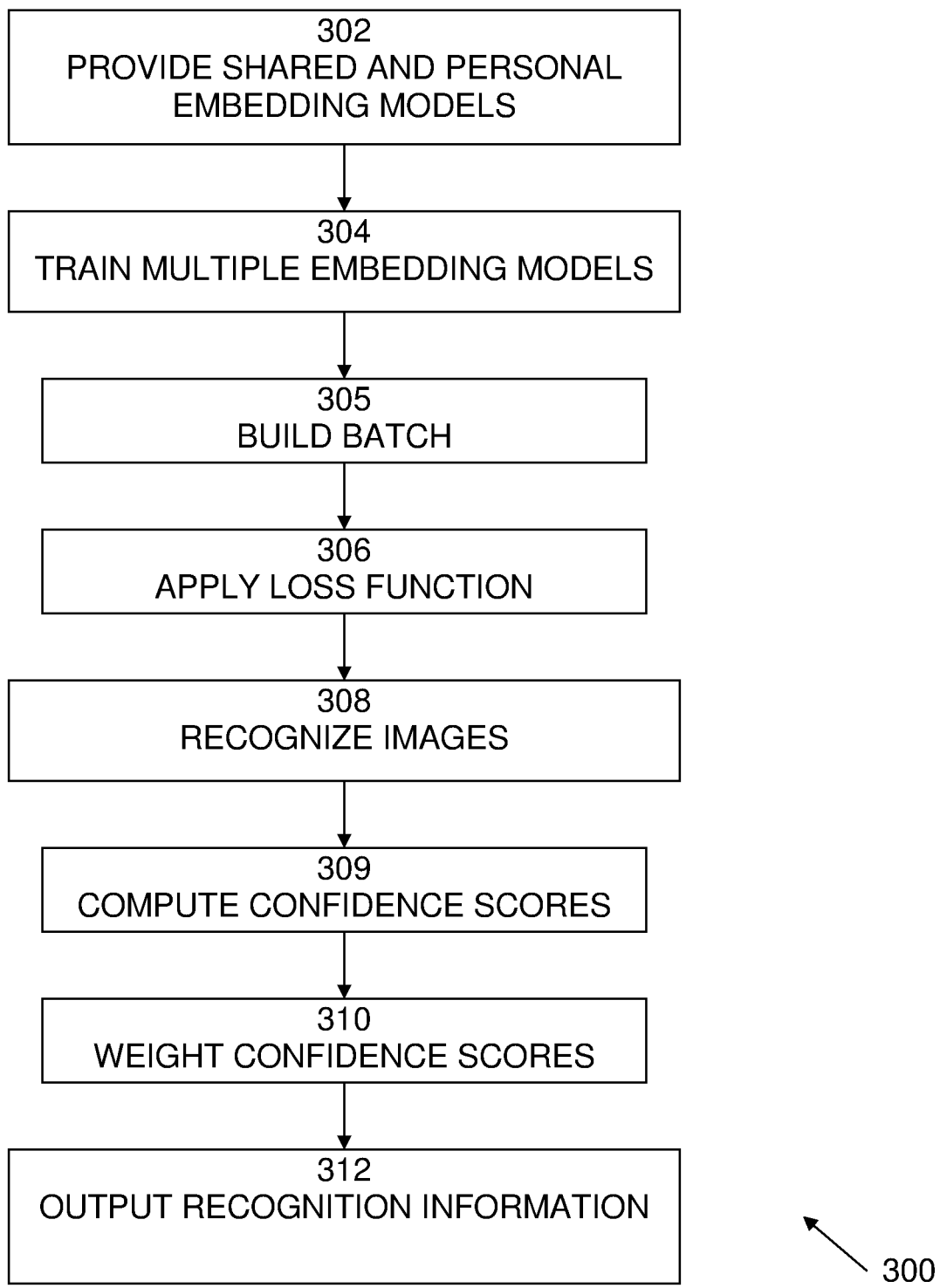
FIG. 3 is an exemplary illustration of a process according to embodiments of the present systems and methods.

An example of a process 300 according to embodiments of the present systems and methods is shown in FIG. 3. It is best viewed in conjunction with FIGS. 1 and 2. Process 300 begins with 302, in which models 106, such as personal models 116 and shared model 118 may be provided. Personal models 116 and shared models 118 may be empty, that is, including only schema information, but no model data, or personal models 116 and shared model 118 may be partially trained and include some model data, but may require further training. At 304, at least some personal models 116 may be trained using training images 104. For example, common backbone model 202 may be pretrained on a large visual dataset, for example, the ImageNet dataset for the classification task, and may be fixed during the training of the rest of the model. Embedding model 204 including the embedding subnetworks may be trained jointly. For example, multiple embedding models may be trained jointly so that each category is well represented in at least one embedding.

For example, to train embedding model 204, at 305, a batch of training data may be built. Each batch may include a plurality of multi-plets. For example, for a category "C", each multi-plet may include an anchor data point from category C, and a pair including a positive data point and a negative data point for each of the N embeddings being learned. For example, the negative data point may be the data point closest to the anchor data point, according to the particular embedding being considered, from a category other than C. Likewise, the positive point may be a random data point from the same category C as the anchor data point or may be any data point from the same category C that is sufficiently close, such as within the first few nearest neighbors. The positive data point may optionally be the closest in the particular embedding being considered. Personal models 116 may be trained using image data associated with particular users, individuals, or subjects. Such training data may be labeled or annotated. Some personal models may not be trained, for example, because further training is not needed or because not all models may be used. Likewise, shared model 118 may be trained, or further trained.

At 306, a loss function may be applied to each batch. As is well-known, minimizing the loss function on each batch will minimize the loss function over the entire dataset. The loss function is formulated to determine whether the minimum distance between the anchor and the positives (in each of their corresponding embeddings), plus some constant margin, is smaller than the minimum distance between the anchor and each of the negatives (in each of their corresponding embeddings). If this is the case, the neural network parameters are not adjusted. However, if the minimum distance between the anchor and the negatives is smaller, then the neural network parameters are adjusted to move the positives closer, using, for example, a gradient descent function. This is achieved by reducing the minimum distance between the anchor data point and each positive data point (in each corresponding embedding) below the corresponding minimum over the distances between the anchor and the negative data points. This provides that once properly trained, the anchor is closer to the positive than to any of the negatives in at least one of the embedding subnets.

As a result of the above-described training process, the embeddings 213A-X may "distribute among them" the categories, each one "taking responsibility" (representing well) some subset of the categories. A map may be built of the emerging correspondence.

At 308, once models 106 have been trained, images included in image data 110 may be recognized using recognition processing 112 to recognize features, persons, items, subjects, etc. that may be present in images 110. For example, received query image 208 may be input to common backbone model 202, where image feature vector 210 is computed. Image feature vector 210 may be input to embedding model 204 and a set of embedding vectors 212A-N may be computed. For example, for each query image 208 that is received, embedding vectors 212A-N may be generated corresponding to every embedding space.

The process may then select one or more embedding vectors, corresponding to one or more embedding spaces, as the most likely embedding vectors to be useful for the relevant categories. In particular, at 309, for each embedding vector 212A-N and for each visual category, probability model 206 may compute a confidence score (probability) for the visual object in the query image to belong to this category. For example, the score may be computed using the Nearest Neighbors (NN) method, in which the (embeddings of) training data points may be used to compute the similarity of the query object to objects in this category. The Nearest Neighbor process within each embedding may be augmented with the weight reflecting how well this embedding treats the neighbor's category. Further, the context of the incoming query, such as the category group, for example, the user ID, may provide prior distribution information over embeddings. For example, this context information may allow the selection of one or few embeddings that are well adjusted to this user's categories.

At 310, the scores may be weighted by the per-class posterior distributions 214, which may include a weight distribution on the embeddings given the categories, which may be computed on the training data. This may allow each class to learn which of the embeddings are best used for the categories. The scores may be further weighted by the per-user posterior distributions 216, which may include a weight distribution on the embeddings given the user ID. Thus, for each category, the scores from different embeddings may be aggregated with these weights, as well as per-class weights, which may provide personalization of the search based on weighting of features that are important to each user. This may provide the capability to select those embedding spaces that are most likely to be useful for the particular categories and the particular user associated with each query image 208. For example, based on the training, data from a particular user may be determined to be most likely to be usefully modeled by particular embedding spaces, which may include the categories relevant to that user.

At 311, the recognition output information 114 may be output from recognition processing 112 and may include information such as identifications of such features, persons, items, subjects, etc., as well as likelihoods or confidences in the recognitions.

Embedding is a technique by which instances of input data may be represented by numerical values. For example, an image may be represented by a set or vector of feature values, each value representing the presence or absence, or amount, of an image feature. An embedding model for visual recognition may include a model of such feature sets or vectors for images having a variety of features. Each feature may be, or may be included in, categories. For different images or different groups or types of images, different categories, or sets of categories may be used for recognition. Such categories or sets of categories may be independent or may overlap with other categories or sets of categories.

Personal embedding model 112 may correspond to a personal set of categories of a user, individual, subject, etc., and may be used in addition to shared model 114 for visual recognition processing 108. Shared models may include categories that may be used for visual recognition processing 108, which may be shared among users, individuals, subjects, etc. The multiple embedding models may be trained simultaneously and may be implicitly tuned to represent subsets of different categories and sub-categories to both provide more flexibility to the system and in order to handle unlimited variability of the whole set of categories.

Personal embedding model 112 may be optimized for nearest neighbor retrieval by re-formulating the visual recognition training objective into a "semantics preserving" metric learning that tries to ensure that data points of the same concept, such as visual category, may be mapped to nearby vectors. Use of personal embedding model 112 may increase the recognition rates for the repeated items, especially in the limited set for each user. Likewise, use of personal embedding model 112 may reduce search time, due to the limited size of the set of objects in the user's personal embedding model 112. Further, use of personal embedding model 112 may require a smaller number of points to train the model, since the re-formulated (metric learning) training objective may be shared among all the users, in a sense that the concept of "semantic proximity" proliferates between different classes owned by different users and allows combining all the users into a unified training process (that is multiple data points from many different classes are jointly optimized under the "should be close" and "should be far" essentially binary labels defined on pairs).

Figure 4:
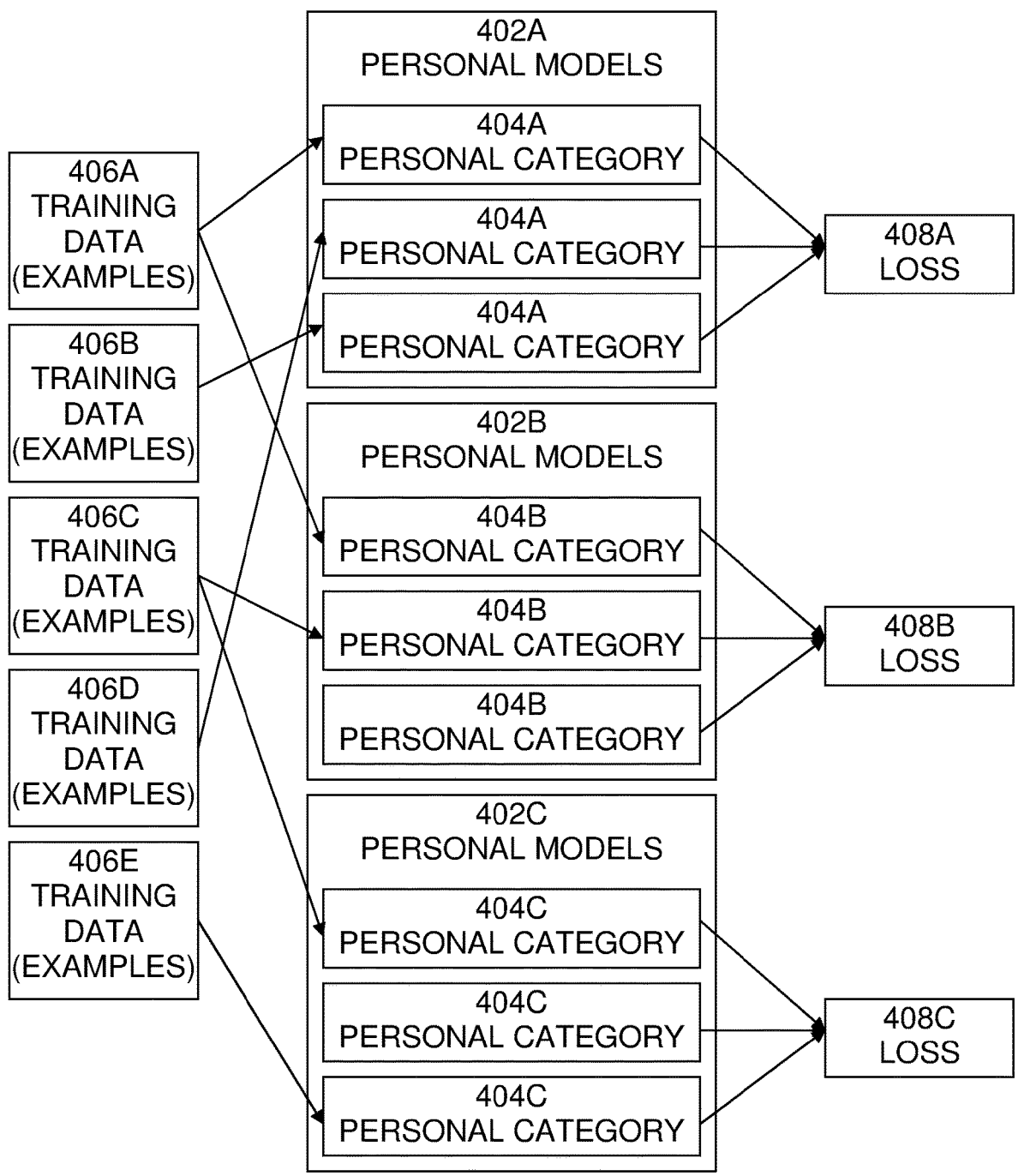
FIG. 4 is an exemplary illustration of training personal embedding models.

Embodiments of the present systems and methods may be based on training an image embedding model (into a high dimensional vector space) or a set of multiple embedding models. Such embedding models may include neural network (NN) based models or other supervised learning techniques. An example of such training is shown in FIG. 4. As shown in this example, there may be a plurality of personal embedding models 402A-C. Each personal embedding model 402A-C may include a plurality of personal categories, such as 404A-C. Multiple embedding models 402A-C may be simultaneously trained using sets of training data 406A-E, such as example images, and using a loss function 408A-C.

Multiple embedding models 402A-C may be simultaneously trained using, for example, a form of metric learning loss, such as triplet loss, that is governed by groups of objects having representations (the embedding) that may be kept close, such as examples coming from the same class or category of objects, while separating the different object categories as far from each other as possible. Typically, each user of the system is only interested in recognizing a small subset of these groups, meaning that the embedding(s) do not need to separate all the categories from each other, but only need to ensure that for each user his/her personal categories are well separated. In this respect, a multiple embedding based solution may allow selection, for each user, of an embedding that best suits his/her groups, or create a new one if no such embedding is readily available. In addition, this setup provides a way for the system to train for a very large amount of categories with few data points each, as a common objective is shared across all the (large) set of combined data from all classes—to minimize distances within the categories and to maximize the separation between them.

The loss function for joint training of multiple embedding models may include computing multiple embedding model data for each data point. A loss function, such as triplet loss, may be computed for each of the computed multiple embedding models. The loss function may be designed to find least one embedding where the basic triplet loss is low. This will cause the different embedding models to split the categories among them, so that each one will be "responsible" for a subset of categories (providing for them a high inter-category distances and low intra-category distances). It is easy enough to determine which categories belong to which embedding, and to use the system in an appropriate way, admitting classification results, based on embedding X, only for the categories it is responsible for. The input to triplet loss may include data representing three embedding models of data points, such as the base (that belongs to category A), the positive data point (also from category A, which should be at small distance from the base) and the negative data point (from category B≠A, which should be at large distance from the base). To achieve this goal, the loss measures, roughly, the difference $\max(0, m+d(\text{base}, \text{positive})-d(\text{base}, \text{negative}))$, where m is the desired margin between different category embedding models. As the loss is minimized, the distances behave as desired.

In embodiments, hard negative mining for triplet loss may be applied. In each triplet, the negative data point may be chosen to be the closest to the base data point (among all the possible negative data points) according to the current state of the embedding model. In multi-embedding embodiments, this means generating multiple hard negatives according to each of the embedding models and modifying the objective function to consider the minimal distance to each of them in each of the embedding models.

In embodiments, the present systems and method may be utilized for a number of applications. Examples may include, recognizing food categories large number of people using a common mechanism replicated on a cloud of servers. Each user may train a limited set of personal food categories, for example, 100 categories of repeated foods, which may cover, for example, 95%+ of the person's repeated food types. In embodiments, the amount of training examples, which may be labeled or annotated, for each personal food category may be relatively small, for example up to 5-10 examples.

In another example, embodiments may be used to recognize phenotypes, such as typical facial features, of rare genetic syndromes. The amount of example images available for each phenotype may typically be small, while the set of syndromes may be large and potentially may be unbounded. The users of the system, such as local physicians, typically observe a very limited set of syndromes typical to the local population.

In another example, embodiments may be used to recognize products in a retail store. In this case, there typically may be large numbers of categories, possibly in the millions, and a limited set of data points, such as store online catalogs for online shopping. Likewise, for example, brand logos may be recognized.

In embodiments, the present systems and methods may be used for, for example, building visual recognition engines for unbounded category setups, such as food logging, etc. Likewise, embodiments may be used to support scenarios where large quantities of users with small amounts of data want to solve multiple personal recognition problems using a common engine that can continuously evolve using the user data. This evolution may occur even though each separate user dataset is not large enough to improve the engine by itself.

Figure 5:
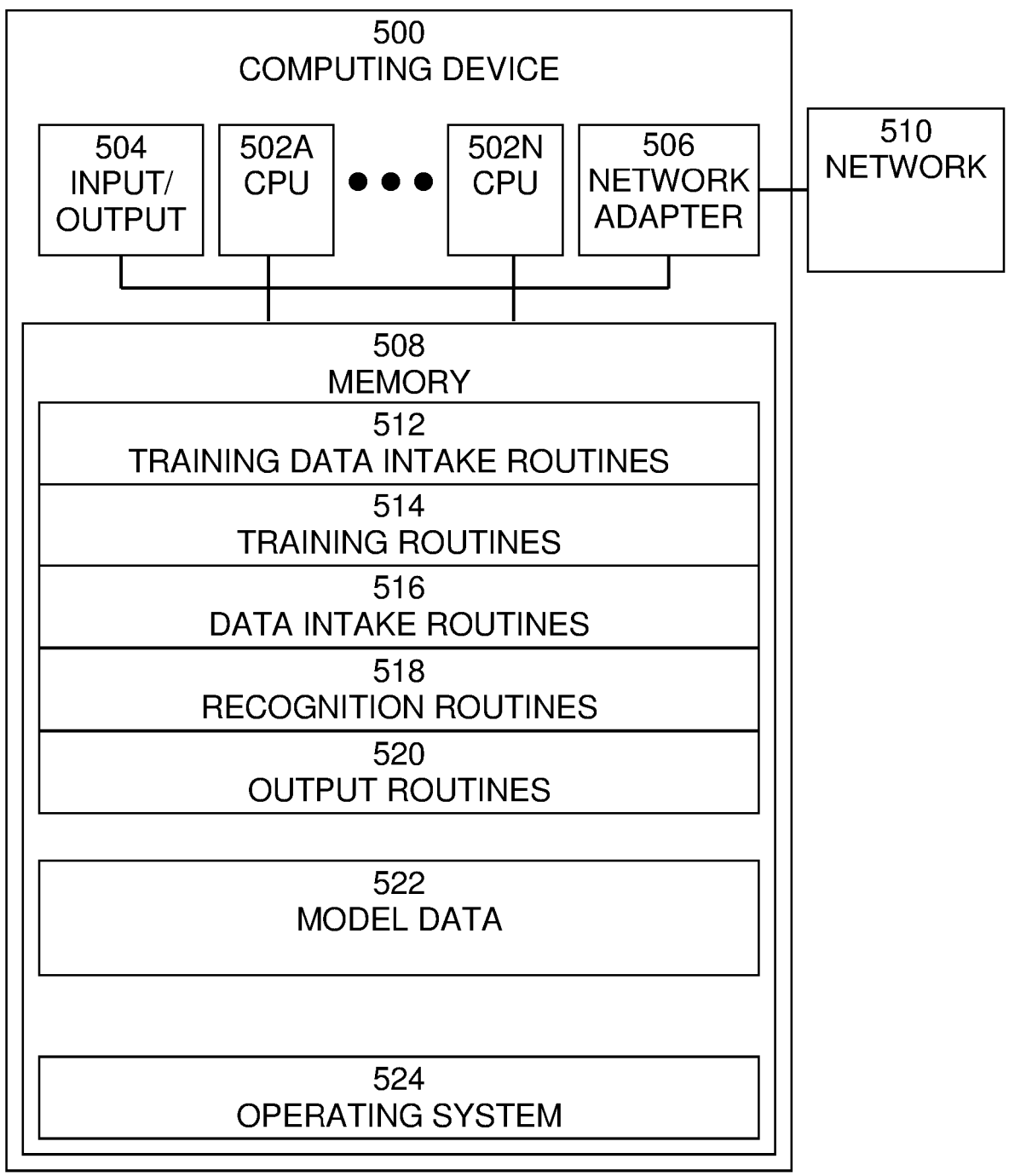
FIG. 5 is an exemplary illustration of a computer system in which embodiments of the present systems and methods may be implemented.

An exemplary block diagram of a computer system 502, in which processes involved in the embodiments described herein may be implemented, is shown in FIG. 5. Computer system 502 may be implemented using one or more programmed general-purpose computer systems, such as embedded processors, systems on a chip, personal computers, workstations, server systems, and minicomputers or mainframe computers, or in distributed, networked computing environments. Computer system 502 may include one or more processors (CPUs) 502A-502N, input/output circuitry 504, network adapter 506, and memory 508. CPUs 502A-502N execute program instructions in order to carry out the functions of the present communications systems and methods. Typically, CPUs 502A-502N are one or more microprocessors, such as an INTEL CORE® processor. FIG. 5 illustrates an embodiment in which computer system 502 is implemented as a single multi-processor computer system, in which multiple processors 502A-502N share system resources, such as memory 508, input/output circuitry 504, and network adapter 506. However, the present communications systems and methods also include embodiments in which computer system 502 is implemented as a plurality of networked computer systems, which may be single-processor computer systems, multi-processor computer systems, or a mix thereof.

Input/output circuitry 504 provides the capability to input data to, or output data from, computer system 502. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 506 interfaces device 500 with a network 510. Network 510 may be any public or proprietary LAN or WAN, including, but not limited to the Internet.

Memory 508 stores program instructions that are executed by, and data that are used and processed by, CPU 502 to perform the functions of computer system 502. Memory 508 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 508 may vary depending upon the function that computer system 502 is programmed to perform. In the example shown in FIG. 5, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present communications systems and methods may include any and all such arrangements.

In the example shown in FIG. 5, memory 508 may include training data intake routines 512, training routines 514, data intake routines 516, recognition routines 518, output routines 520, model data 522, and operating system 524. Data intake routines 512 may include software routines to obtain training data, such as images, which may be labeled or annotated. Training routines 514 may include software routines to train embedded models, such as personal models and shared models, to generate such models, and to store representations of the trained models as model data 522. Such models may include personal models and shared models. Data intake routines 516 may include software routines to obtain data for input to recognition processing and may include data such as images. Recognition routines 518 may include software routines to perform recognition processing using the data from data intake routines 516. Output routines 520 may include software routines to generate output information from recognition routines 518. Model data 522 may include data representing trained models. Operating system 524 may provide overall system functionality.

As shown in FIG. 5, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method of visual recognition, the method comprising:

training a deep convolutional neural network including a common backbone network, a plurality of embedding models, and a classification model on a training dataset comprising a plurality of visual categories, wherein the plurality of embedding models are trained jointly using a single loss function, and wherein the training dataset comprises a plurality of multi-plets, each multi-plet corresponding to a visual category and comprising an anchor data point from the visual category and a data point pair for each of the plurality of embedding models being trained, wherein each data point pair comprises a positive data point from the visual category and a negative data point from another visual category, and wherein the loss function comprises:

when a minimum distance between the anchor data point and each positive data point in each corresponding embedding plus a predetermined constant margin is smaller than a minimum distance between the anchor data point and each negative data point in each corresponding embedding, making no adjustment to parameters of the deep convolutional neural network; and otherwise, adjusting parameters of the deep convolutional neural network to reduce the minimum distance between the anchor data point and each positive data point in each corresponding embedding, so that the anchor data point is closer to a positive data point than to a negative data point in at least one embedding model;

recognizing images from image data received from image sources using the trained deep convolutional neural network; and outputting information relating to the recognized images.

2. The method of claim 1, wherein each embedding model corresponds to at least one visual category.

3. The method of claim 2, wherein the negative data point comprises a data point from the another category that is closest to the anchor data point and the positive data point is selected from one of: a data point selected randomly from the category, a data point selected from a few data points from the category that are closest to the anchor data point, and a data point from the category that is the closest to the anchor data point in the embedding model of the data point pair.

4. The method of claim 3, wherein recognizing the images comprises:

computing a confidence score for each image indicating similarity of each image with data points in each visual category;

weighting the confidence scores by a per-class posterior distribution including a weight distribution on the embedding models given the categories and computed on training data; and weighting the confidence scores by a per-user posterior distribution including a weight distribution on the embedding models given an identification of a user.

5. The method of claim 4, wherein weighting the confidence scores by a per-user posterior distribution provides personalization of results based on features that are important to the user.

6. A system for visual recognition, the system comprising a processor, memory accessible by the processor, and computer program instructions stored in the memory and executable by the processor to perform:

training a deep convolutional neural network including a common backbone network, a plurality of embedding models, and a classification model on a training dataset comprising a plurality of visual categories, wherein the plurality of embedding models are trained jointly using a single loss function, and wherein the training dataset comprises a plurality of multi-plets, each multi-plet corresponding to a visual category and comprising an anchor data point from the visual category and a data point pair for each of the plurality of embedding models being trained, wherein each data point pair comprises a positive data point from the visual category and a negative data point from another visual category, and wherein the loss function comprises:

when a minimum distance between the anchor data point and each positive data point in each corresponding embedding plus a predetermined constant margin is smaller than a minimum distance between the anchor data point and each negative data point in each corresponding embedding, making no adjustment to parameters of the deep convolutional neural network; and otherwise, adjusting parameters of the deep convolutional neural network to reduce the minimum distance between the anchor data point and each positive data point in each corresponding embedding, so that the anchor data point is closer to a positive data point than to a negative data point in at least one embedding model;

recognizing images from image data received from image sources using the trained deep convolutional neural network; and outputting information relating to the recognized images.

7. The system of claim 6, wherein each embedding model corresponds to at least one visual category.

8. The system of claim 7, wherein the negative data point comprises a data point from the another category that is closest to the anchor data point and the positive data point is selected from one of: a data point selected randomly from the category, a data point selected from a few data points from the category that are closest to the anchor data point, and a data point from the category that is the closest to the anchor data point in the embedding model of the data point pair.

9. The system of claim 8, wherein recognizing the images comprises:

computing a confidence score for each image indicating similarity of each image with data points in each visual category;

weighting the confidence scores by a per-class posterior distribution including a weight distribution on the embedding models given the categories and computed on training data; and weighting the confidence scores by a per-user posterior distribution including a weight distribution on the embedding models given an identification of a user.

10. The system of claim 9, wherein weighting the confidence scores by a per-user posterior distribution provides personalization of results based on features that are important to the user.

11. A computer program product for visual recognition, the computer program product comprising a non-transitory computer readable storage having program instructions embodied therewith, the program instructions executable by a computer, to cause the computer to perform a method comprising:

training a deep convolutional neural network including a common backbone network, a plurality of embedding models, and a classification model on a training dataset comprising a plurality of visual categories, wherein the plurality of embedding models are trained jointly using a single loss function, and wherein the training dataset comprises a plurality of multi-plets, each multi-plet corresponding to a visual category and comprising an anchor data point from the visual category and a data point pair for each of the plurality of embedding models being trained, wherein each data point pair comprises a positive data point from the visual category and a negative data point from another visual category, and wherein the loss function comprises:

when a minimum distance between the anchor data point and each positive data point in each corresponding embedding plus a predetermined constant margin is smaller than a minimum distance between the anchor data point and each negative data point in each corresponding embedding, making no adjustment to parameters of the deep convolutional neural network; and otherwise, adjusting parameters of the deep convolutional neural network to reduce the minimum distance between the anchor data point and each positive data point in each corresponding embedding, so that the anchor data point is closer to a positive data point than to a negative data point in at least one embedding model;

recognizing images from image data received from image sources using the trained deep convolutional neural network; and outputting information relating to the recognized images.

12. The computer program product of claim 11, wherein each embedding model corresponds to at least one visual category.

13. The computer program product of claim 12, wherein the negative data point comprises a data point from the another category that is closest to the anchor data point and the positive data point is selected from one of: a data point selected randomly from the category, a data point selected from a few data points from the category that are closest to the anchor data point, and a data point from the category that is the closest to the anchor data point in the embedding model of the data point pair.

14. The computer program product of claim 13, wherein recognizing the images comprises:

computing a confidence score for each image indicating similarity of each image with data points in each visual category;

weighting the confidence scores by a per-class posterior distribution including a weight distribution on the embedding models given the categories and computed on training data; and weighting the confidence scores by a per-user posterior distribution including a weight distribution on the embedding models given an identification of a user;

wherein weighting the confidence scores by a per-user posterior distribution provides personalization of results based on features that are important to the user.

* * * * *